US012568209B2

(12) United States Patent
Ambroise et al.

(10) Patent No.: US 12,568,209 B2
(45) Date of Patent: Mar. 3, 2026

(54) VIDEO ENCODING APPLYING A REFRESH SCHEME

(71) Applicant: intoPIX SA, Mont-Saint-Guibert (BE)

(72) Inventors: Renaud Ambroise, Mont-Saint-Guibert (BE); Gaël Rouvroy, Mont-Saint-Guibert (BE); Pascal Pellegrin, Mont-Saint-Guibert (BE); Allan Barrea, Mont-Saint-Guibert (BE)

(73) Assignee: INTOPIX SA, Mont-Saint-Guibert (BE)

( * ) Notice: Subject to any disclaimer, the term of this patent is extended or adjusted under 35 U.S.C. 154(b) by 0 days.

(21) Appl. No.: 18/860,542

(22) PCT Filed: Apr. 26, 2023

(86) PCT No.: PCT/EP2023/061057
§ 371 (c)(1),
(2) Date: Oct. 25, 2024

(87) PCT Pub. No.: WO2023/209059
PCT Pub. Date: Nov. 2, 2023

(65) Prior Publication Data
US 2025/0317556 A1 Oct. 9, 2025

(30) Foreign Application Priority Data
Apr. 26, 2022 (EP) .................................... 22170156

(51) Int. Cl.
| *H04N 7/12* | (2006.01) |
| *H04N 19/107* | (2014.01) |
| *H04N 19/172* | (2014.01) |
| *H04N 19/46* | (2014.01) |

(52) U.S. Cl.
CPC ......... *H04N 19/107* (2014.11); *H04N 19/172* (2014.11); *H04N 19/46* (2014.11)

(58) Field of Classification Search
CPC ..................................................... H04N 19/107
See application file for complete search history.

(56) References Cited

U.S. PATENT DOCUMENTS 8,559,501 B2 10/2013 Chen

OTHER PUBLICATIONS

Quqing Chen et al: "Attention based Adaptive Intra Refresh for Error Resilient Video Coding", 25. Picture Coding Symposium; Apr. 24-Apr. 26, 2006; Beijing,, Apr. 24, 2006 (Apr. 24, 2006), XP030080287, figure 1.
PCT/EP2023/061057, International Search Report, Jul. 31, 2023, European Patent Office, P.B. 5818 Patentlaan 2 NL—2280 HV Rijswijk.
PCT/EP2023/061057, Written Opinion of the International Searching Authority , Jul. 31, 2023, European Patent Office, P.B. 5818 Patentlaan 2 NL—2280 HV Rijswijk—Pays Bas.

*Primary Examiner* — Young Lee
(74) *Attorney, Agent, or Firm* — The Jansson firm; Pehr B. Jansson

(57) ABSTRACT

A sequence of frames is encoded in the following manner. An evaluation for respective zones in a frame is made whether a zone should be encoded in an intra-mode or in an inter-mode. A refresh scheme is applied that causes a set of zones in the frame to be forcibly encoded in the intra-mode, irrespective of the evaluation made. A specification of the refresh scheme is provided, which identifies the set of zones in the frame that are forcibly encoded in the intra-mode.

7 Claims, 4 Drawing Sheets

100

300

302

VIDEO ENCODING APPLYING A REFRESH SCHEME

FIELD OF THE INVENTION

An aspect of the invention relates to a method of encoding a sequence of frames in which a refresh scheme is applied. The method may be used, for example, in a camera device for encoding a sequence of frames that has been captured. The camera device may then store the sequence of frames that has been encoded or may send this sequence, which constitutes a video, to another device, or both. Other aspects of the invention relate to a video encoder, a computer program for a video encoder, a data set comprising an encoded sequence of frames, and a video decoder.

BACKGROUND ART

There are numerous video encoding techniques that apply intra-mode encoding and inter-mode encoding. A frame, or at least a zone therein, that is encoded in an intra-mode makes no reference to another frame. Accordingly, intra-mode encoding produces an encoded frame, or an encoded zone, that is self-contained. Conversely, a frame, or at least a zone therein, that is encoded in the inter-mode makes reference to one or more previously encoded frames. Generally, a differential representation of a zone to be encoded is generated. The differential representation corresponds with a difference between, on the one hand, the zone to be encoded and, on the other hand, a corresponding zone in a decoded version of a previously encoded frame. Accordingly, inter-mode encoding produces an encoded frame, or an encoded zone, that is intrinsically linked with one or more previously encoded frames.

Video encoding may involve making an evaluation whether a frame, or a zone therein, should be encoded in the intra-mode or in the inter-mode. This evaluation may be based on one or more criteria, which generally include a smallest amount of data produced by encoding as a criterion. In case the intra-mode is expected to produce the smallest amount of data, this mode may be applied. Conversely, in case the inter-mode is expected to produce the smallest amount of data, this mode may be applied. In general, the evaluation will retain the intra-mode as best if there are relatively large differences between the frame to be encoded, or the zone therein, and frames to which reference can be made. This will typically be the case, for example, if there is a change in scene, or a scene where many changes occur. The evaluation will retain the inter-mode as best if there are relatively small differences between the frame to be encoded, or the zone therein, and frames to which reference can be made. This will typically be the case, for example, in a quiet scene, akin to a still picture, or a static background in a scene.

In case the intra-mode or the inter-mode is applied in accordance with an evaluation as described hereinbefore, it may happen that there is a relatively long series of successive frames that are encoded in the inter-mode. This series of successive frames will thus not comprise any frame that is encoded in the intra-mode. The same applies with respect to a zone in a series of successive frames. If, for example, the zone is part of a static background, the zone will be encoded in the inter-mode throughout the series of successive frames.

The following decoding delay problem may present itself if there is a relatively long series of successive frames that are encoded in the inter-mode. A decoder that starts decoding during this relatively long series of successive frames will not be able to produce correctly decoded video as long as this series lasts. Namely, the decoder must first decode a frame that has been encoded in the intra-mode in order to have a valid reference, a valid decoding starting point. It may thus take a relatively long time before the decoder is able to produce correctly decoded video. This decoding delay problem also occurs if a zone in a relatively long series of successive frames is exclusively encoded in the inter-mode. There will be no frame in this series for which the zone is encoded in the intra-mode.

A refresh scheme may be applied to address the decoding delay problem described hereinbefore. Basically, the refresh scheme frequently causes a frame, or at least a zone therein, to be forcibly encoded in the intra-mode for one out of several successive frames. That is, this one frame, or the zone therein, is encoded in the intra-mode although the evaluation was made that the frame, or the zone therein, should be encoded in the inter-mode. The refresh scheme thus ensures that references occur frequently in a series of successive frames. Accordingly, this prevents a too long delay in obtaining correctly decoded video.

Patent publication WO2020249790A1 describes certain aspects discussed hereinbefore. Specifically, this patent publication describes an encoding assembly that evaluates for a portion of a linearly transformed frame whether the following condition applies, or not. When the portion of the linearly transformed frame is encoded in the inter mode, an encoded version of the portion of the linearly transformed frame is obtained that comprises a smaller amount of data than an encoded version that is obtained by encoding the portion of the linearly transformed frame in the intra mode. The encoding assembly encodes the portion of the linearly transformed frame in the inter mode if this condition applies. If not, the portion of the linearly transformed frame is encoded in the intra mode. An encoding mode flag is provided, which indicates whether the portion of the linearly transformed frame is encoded in the intra mode or in the inter mode.

Patent publication WO2020249790A1 further describes that the encoding assembly periodically encodes respective linearly transformed frame portions in the intra mode. This can be regarded as a refresh mechanism, which allows quickly achieving relatively good image quality at a decoding end. A video decoder can quickly lock in, as it were, on an encoded video stream provided by a video encoder that incorporates the encoding assembly. What is more, this also allows more robust video transmission. In case a portion of the encoded video stream gets lost due to, for example errors, an impacted zone of a frame can relatively quickly be restored.

SUMMARY OF THE INVENTION

There is a need for a video encoding technique that allows an improvement in video quality within a given budget for an amount of encoded video data.

An aspect of the invention as defined in claim 1 provides for a method of encoding a sequence of frames so as to obtain an encoded sequence of frames, the method comprising:

- making an evaluation for respective zones in a frame whether a zone should be encoded in an intra-mode or in an inter-mode;
- applying a refresh scheme that causes a set of zones in the frame to be forcibly encoded in the intra-mode, irrespective of the evaluation made; and providing a specification of the refresh scheme identifying the set of zones in the frame that are forcibly encoded in the intra-mode.

A further aspect of the invention as defined in claim 3, provides for a video encoder adapted to encode a sequence of frames so as to obtain an encoded sequence of frames, the video encoder comprising:

a encoding-mode selection assembly comprising:

an encoding-mode evaluation module adapted to make an evaluation for respective zones in a frame whether a zone should be encoded in an intra-mode or in an inter-mode; and a refresh scheme application module adapted to cause a set of zones in the frame to be forcibly encoded in the intra-mode, irrespective of the evaluation made; and a data packaging module adapted to provide a data set comprising the encoded sequence of frames and including a specification of the refresh scheme identifying the set of zones in the frame that are forcibly encoded in the intra-mode.

A yet further aspect of the invention as defined in claim 4, provides for a computer program for a video encoder, the computer program comprising a set of instructions that enables the video encoder to carry out the method defined hereinbefore.

A yet further aspect of the invention as defined in claim 5, provides for a data set comprising an encoded sequence of frames obtained by the method as defined hereinbefore; including the specification of the refresh scheme identifying the set of zones in the frame that are forcibly encoded in the intra-mode.

A yet further aspect of the invention as defined in claim 6, provides for a video decoder adapted to decode a sequence of encoded frames obtained by the method as defined hereinbefore, the decoder being adapted to use the specification of the refresh scheme identifying the set of zones in the frame that are forcibly encoded in the intra-mode for decoding the zones comprised in the set in the intra mode.

In each of these aspects, the specification of the refresh scheme makes that encoding mode flags need not be used for zones in the frame that are forcibly encoded in the intra-mode. Namely, the specification identifies these zones as to be decoded in the intra-mode. The specification of the refresh scheme may require fewer bits than a number of encoding flags for the zones that are forcibly encoded in the intra-mode. Thus, since an encoding mode flag requires at least one bit, the specification of the refresh scheme may be more efficient than using an encoding mode flag for zones that are forcibly encoded in the intra-mode. Accordingly, a saving in bits may be achieved. The bits that become available may be used for representing video data in an encoded form with greater precision. This is particularly the case when the invention claimed is used in a context where making a distinction between forcibly intra-mode encoded zones and non-forcibly intra-mode encoded zones is desired. The invention thus allows an improvement in video quality within a given budget for an amount of encoded video data.

For the purpose of illustration, some embodiments of the invention are described in detail with reference to accompanying drawings. In this description, additional features will be presented, some of which are defined in the dependent claims, and advantages will be apparent.

DESCRIPTION OF SOME EMBODIMENTS

Figure 1:
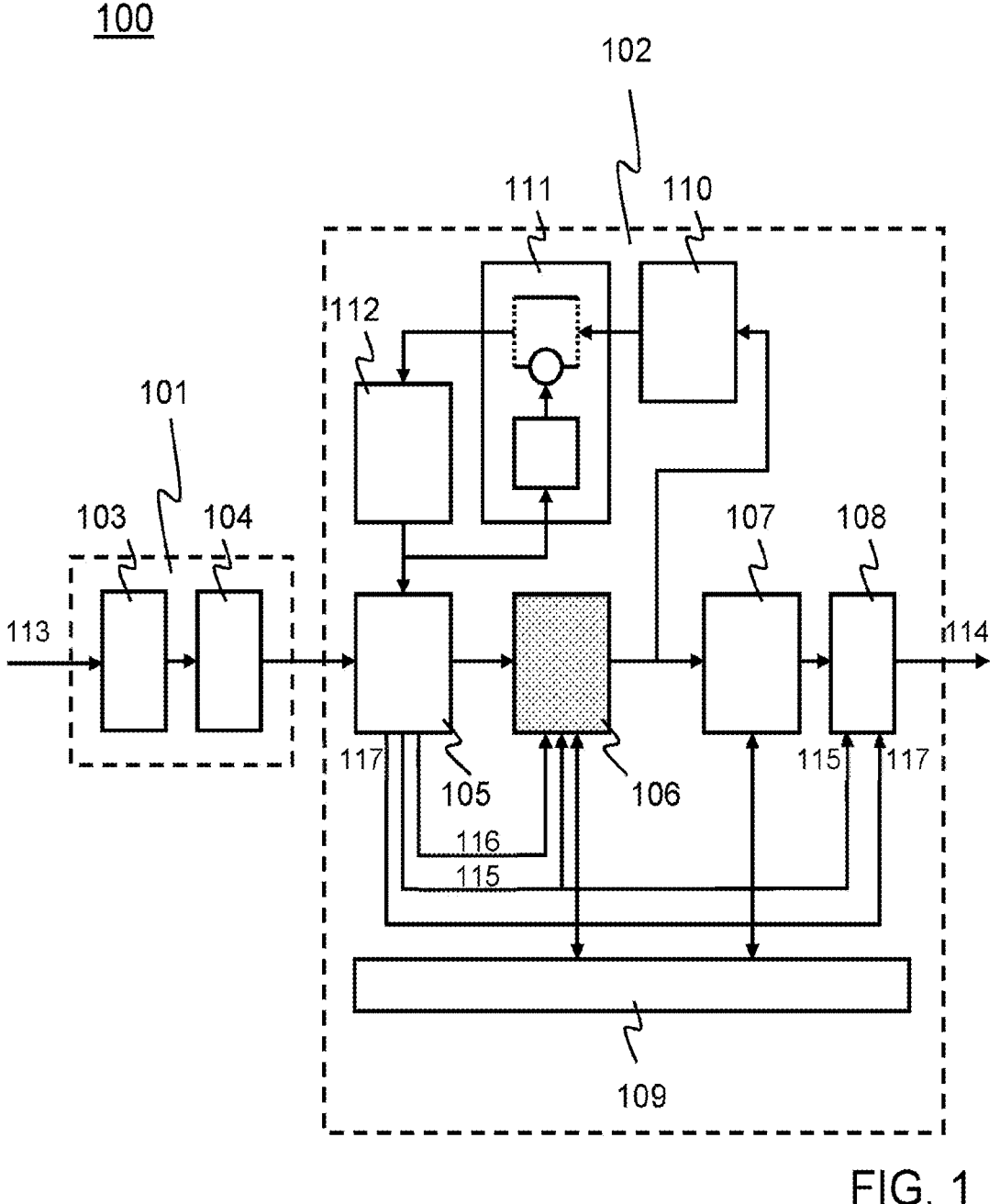
FIG. 1 is a schematic block diagram of a video encoder.

FIG. 1 schematically illustrates a video encoder 100. FIG. 1 provides a schematic block diagram of the video encoder 100. The video encoder 100 may be, for example, comprised in a communication device that can capture a video, or that can store a video, or both, such as, for example, a smart phone. The video encoder 100 may enable the communication device to efficiently transfer a video to another communication device via a communication channel that may be provided by a network.

The video encoder 100 illustrated in FIG. 1 is an innovatively improved version of a video encoder 100 presented in patent publication WO2020249790A1 mentioned hereinbefore as background art. The latter video encoder 100 will be referred to hereinafter as prior art video encoder for the sake of convenience. The video encoder 100 illustrated in FIG. 1 of the present patent application comprises a similar set of functional entities. These functional entities include a linear transform assembly 101 and an encoding assembly 102. The linear transform assembly 101 may comprise a reversible color transform module 103 and a wavelet transform module 104. The encoding assembly 102 may comprise coding-mode selection assembly 105, a quantization assembly 106, an entropy coding module 107, a data packaging module 108, a rate allocation module 109, a dequantization module 110, a reconstruction module 111, and a reference frame buffer assembly 112.

Basically, the video encoder 100 may encode a sequence of frames 113, which may constitute a video, so as to obtain an encoded sequence of frames 114. The encoded sequence of frames 114 may thus constitute an encoded video comprising a smaller amount of data than the video in its original form. The video encoder 100 basically operates in a manner similar to that of the prior art video encoder. The description of the prior art video encoder in patent publication WO2020249790A1 therefore equally applies to the video encoder 100 illustrated in FIG. 1, unless indicated otherwise.

In the video encoder 100 illustrated in FIG. 1, the encoding mode selection assembly 105 replaces the encoding mode selection module in the prior art video encoder. Nonetheless, the encoding mode selection assembly 105 may substantially operate in a similar manner. That is, for a series of successive linearly transformed frames, the encoding mode selection assembly 105 makes an evaluation on a frame-by-frame basis for a subband frame portion having a particular position in a linearly transformed frame. The evaluation concerns whether, for the linearly transformed frame concerned, the subband frame portion should be encoded in an intra-mode or in an inter-mode. Like in the prior art video decoder, the evaluation may be based on comparing an intra-mode GCLI sum value with an inter-mode GCLI sum value. The encoding mode selection assembly 105 may thus comprise an encoding mode evaluation module that is similar to that in the prior art video encoder. However, the encoding mode selection assembly 105 need not provide GCLI coding values as an output.

The encoding mode selection assembly 105 may further apply a refresh scheme that frequently causes a subband frame portion having a particular position in a linearly transformed frame to be forcibly encoded in the intra-mode for one out of several successive linearly transformed frames, irrespective of the evaluation made. This aspect has also been described in great detail in patent publication WO2020249790A1. The encoding mode assembly may thus comprise a specific refresh scheme application module.

The encoding mode selection assembly 105 provides an evaluation flag 115 and a refresh flag 116 in association with a subband frame portion. The evaluation flag 115 indicates the evaluation that has been made: whether the subband frame portion should be encoded in the intra-mode or in the inter-mode. The refresh flag 116 indicates whether the subband frame portion has been forcibly encoded in the intra-mode, or not.

A first innovative improvement of the video encoder 100 illustrated in FIG. 1 concerns the quantization assembly 106, which replaces the quantization module in the prior art video encoder. Like the quantization module in the prior art video encoder, the quantization assembly 106 may receive a subband frame portion or a differential representation of a subband frame portion, depending on whether the intra-mode or the inter-mode has been applied, respectively. The quantization module further receives the evaluation flag 115 and refresh flag 116 from the encoding mode selection assembly 105.

Figure 2:
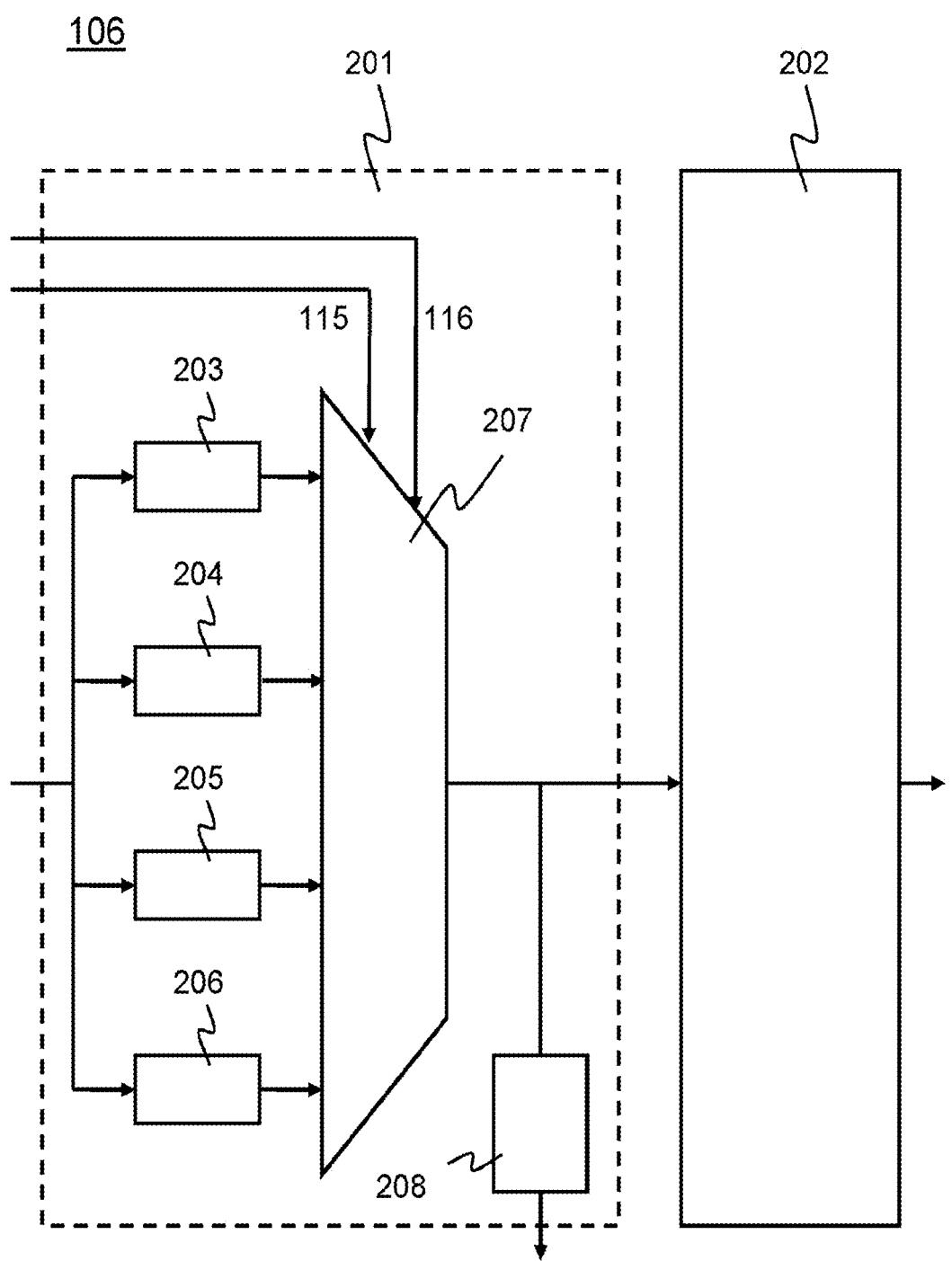
FIG. 2 is a schematic block diagram of a quantization assembly in the video encoder.

FIG. 2 schematically illustrates the quantization assembly 106. The quantization assembly 106 comprises a pre-quantization module 201 and a controlled quantization module 202. In this embodiment, the pre-quantization module 201 comprises a set of bit shifters 203-206, a multiplexer 207, and a GCLI extractor 208. The set of bit shifters 203-206 comprises a first bit shifter 203, a second bit shifter 204, a third bit shifter 205, and a fourth bit shifter 206.

The pre-quantization module 201 basically operates as follows. The set of bit shifters 203-206 receives samples comprised in the subband frame portion in or the differential representation thereof, whichever is provided by the encoding mode selection assembly 105. The first bit shifter 203 does not shift the samples. The second bit shifter 204 shifts the samples two positions to the right. This is equivalent to truncating two least significant bits. The third and the fourth bit shifters 205, 206 shift the samples three positions to the right. This is equivalent to truncating three least significant bits.

The multiplexer 207 selects one of the bit shifters in dependence on the evaluation flag 115 and the refresh flag 116 provided by the encoding mode selection assembly 105. The multiplexer 207 selects the first bit shifter 203 in case the evaluation flag 115 indicates that it has been evaluated that the inter-mode should apply and the refresh flag 116 indicates that the subband frame portion is forcibly encoded in the intra-mode. In that case, the pre-quantization module 201 does not truncate the samples of the subband frame portion.

The multiplexer 207 selects the second bit shifter 204 in case the evaluation flag 115 indicates that it has been evaluated that the inter-mode should apply and the refresh flag 116 indicates there is no forcible encoding in the intra-mode. In that case, the pre-quantization module 201 truncates the two least significant bits of the samples of the subband frame portion.

The multiplexer 207 selects the third bit shifter 205 in case the evaluation flag 115 indicates that it has been evaluated that the intra-mode should apply and the refresh flag 116 indicates that forcible encoding in the intra-mode applies. In that case, the pre-quantization module 201 truncates the three least significant bits of the samples of the subband frame portion.

The multiplexer 207 selects the fourth bit shifter 206 in case the evaluation flag 115 indicates that it has been evaluated that the intra-mode should apply and the refresh flag 116 indicates there is no forcible encoding in the intra-mode. In that case, the pre-quantization module 201 also truncates the three least significant bits of the samples of the subband frame portion.

The following table illustrates the operation of the pre-quantization module 201:

| Evaluation flag 115 (1 for inter) | Refresh flag 116 (1 for refresh) | Pre-quantization "Gain" (implemented as right shift) |
|---|---|---|
| 1 | 1 | 1 (i.e. >> 0) |
| 1 | 0 | ¼ (i.e. >> 2) |
| 0 | 1 | ⅛ (i.e. >> 3) |
| 0 | 0 | ⅛ (i.e. >> 3) |

The table comprises four lines representing four encoding conditions. Each one of these four lines uniquely represents one of the four encoding conditions. The table comprises a right-hand column representing a quantization setting that applies in an encoding condition. In this example, there are three different quantization settings.

A first one of the four lines represents a first encoding condition. In the first encoding condition, a subband frame portion is forcibly encoded in the intra-mode, although it was evaluated that the inter-mode should apply. Since it is the refresh scheme that dictates this forced encoding in the intra-mode, the first encoding condition may be referred to as inter-refreshed encoding condition. The evaluation flag 115 and the refresh flag 116 jointly signal the inter-refreshed encoding condition by both being set to true (1) in this example. A first quantization setting applies in the inter-refreshed encoding condition according to which the subband frame portion is not quantized.

A second one of the four lines represents a second encoding condition. In the second encoding condition, a subband frame portion is encoded in the inter-mode in accordance with the evaluation that was made. Thus, in this encoding condition, the refresh scheme does not dictate forced encoding in the intra-mode. The second encoding condition may thus be simply referred to as inter-encoding condition. The evaluation flag 115 and the refresh flag 116 jointly signal the inter-encoding condition by being set to true (1) and false (0), respectively, in this example. A second quantization setting applies in the inter-encoding condition according to which the subband frame portion is quantized by an effective factor equal to four (4). Accordingly, the pre-quantization module 201 applies a quantization with a four (4) times lower resolution in the inter-encoding condition with respect to the inter-refreshed encoding condition discussed hereinbefore.

A third one of the four lines represents a third encoding condition. In the third encoding condition, a subband portion is encoded in the intra-mode in accordance with the evaluation that was made, while the refresh scheme dictates forced encoding in the intra-mode. In this encoding condition, the evaluation is thus in line with what the refresh scheme dictates. The third encoding condition may be referred to as intra-refreshed encoding condition. The evaluation flag 115 and refresh flag 116 jointly signal the intra-refreshed encoding condition by being set to false (0) and true (1), respectively, in this example. A third quantization setting applies in the intra-refreshed encoding condition according to which the subband frame portion is quantized by an effective factor equal to eight (8). Accordingly, the pre-quantization module 201 applies a quantization with an eight (8) times lower resolution in the intra-refreshed encoding condition with respect to the inter-refreshed encoding condition discussed hereinbefore, and with a two times (2) lower resolution with respect to the inter-encoding condition discussed hereinbefore.

A last, fourth one of the four lines represents a fourth encoding condition. In the fourth encoding condition, a subband portion is encoded in the intra-mode in accordance with the evaluation that was made, while the refresh scheme does not dictate forced encoding in the intra-mode. The fourth encoding condition may thus be simply referred to as intra-encoding condition. The evaluation flag 115 and refresh flag 116 jointly signal the intra-encoding condition by both being set to false (0) in this example. The third quantization setting equally applies in the intra-encoding condition. Indeed, there is no need for quantizing a subband frame portion differently depending on whether the evaluation that the subband frame portion should be encoded in the intra-mode is in line with what the refresh scheme dictates, or not. Thus, any subband frame portion that is encoded in the intra-mode is quantized by an effective factor equal to eight (8).

Thus, the pre-quantization module 201 does not quantize a subband frame portion in the inter-refreshed encoding condition, in which the subband frame portion is forcibly encoded in the intra-mode, although it is evaluated that the inter-mode should apply. In the other encoding conditions, where encoding is in accordance with the evaluation that was made, the pre-quantization module 201 quantizes the subband frame with a given resolution. Thus, a subband frame portion that is forcibly encoded in the intra-mode and contrary to the evaluation that was made, is quantized with a higher resolution than if the subband frame portion were encoded in accordance with the evaluation that was made, whereby the evaluation is one of the following: the intra-mode and the inter-mode.

The pre-quantization module 201 quantizes a subband frame portion with a resolution that is somewhat higher in the inter-encoding condition than in the intra-refreshed and intra-encoding conditions. That is, if encoding is in accordance with the evaluation that was made, the resolution is somewhat higher for encoding in the inter-mode than for encoding in the intra-mode. As discussed hereinbefore, the evaluation will generally indicate that the inter-mode should be applied for encoding a rather static zone, where few changes occur, or even no changes occur. Correspondingly, the evaluation will generally indicate that the intra-mode should be applied for encoding a rather dynamic zone, where many changes occur. Quantizing a rather dynamic zone, where many changes occur, with a relatively low resolution need not significantly affect perceived image quality. Conversely, quantizing a rather static zone, where few or even no changes occur, with a higher resolution than a rather dynamic zone, where many changes occur, may enhance perceived image quality. Thus, quantizing a zone that is encoded in the inter-mode in accordance with the evaluation made with a higher resolution than a zone that is encoded in the intra-mode in accordance with the evaluation made, will generally contribute to an improved perceived image quality.

The controlled quantization module 202 in the quantization assembly 106 may operate in a manner similar to that of the quantization module in the prior art video encoder. Basically, the controlled quantization module 202 quantizes a pre-quantized subband frame portion, or the differential representation thereof, with a resolution that is set by the rate allocation module 109. The rate allocation module 109 applies a control scheme ensuring that encoding the frame, or a portion thereof, produces an amount of data that is within a budget. Accordingly, the resolution of quantization depends on the control scheme.

The pre-quantization module 201 and the controlled quantization module 202 jointly carry out an overall quantization. The pre-quantization module 201 makes that a subband frame portion that is forcibly encoded in the intra-mode, although it was evaluated that inter-mode should apply, gets a preferential treatment in the overall quantization. Namely, in the overall quantization, the resolution may be at least two times (2) higher in the inter-refreshed encoding condition compared with the other encoding conditions. Specifically, in the example discussed hereinbefore, the resolution in the inter-refreshed encoding condition may be about four times (4) higher than in the inter-encoding condition, and about eight (8) times higher than in the intra-refreshed and intra-encoding conditions. As explained hereinbefore, such a preferential treatment allows preventing visual artifacts that may otherwise occur if no preferential treatment is given. However, it should be noted that the embodiment presented here is only one of numerous possible embodiments for giving preferential treatment in quantization.

A second innovative improvement of the video encoder 100 illustrated in FIG. 1 concerns providing, in association with the encoded sequence of frames 114, a specification 117 of the refresh scheme that is applied by the video encoder 100. In this embodiment, the data packaging module 108 receives this specification from the encoding mode selection assembly 105. The data packaging module 108 embeds the specification 117 of the refresh scheme in an output video stream, which includes the encoded sequence of frames 114. This output video stream may be regarded as a data set. For example, the video output stream may be stored in the memory and then takes the form of a video file, which may also be regarded as a data set.

In an embodiment, the specification 117 of the refresh scheme may be comprised in a frame header, which may also be referred to as picture header. The specification may comprise several fields. One field may specify a refresh rate, which may be an integer corresponding to a periodicity in terms of number of frames with which a refresh should be carried out. The other field may define a frame index, which may be an integer too corresponding to a unique serial number identifying a frame's position in the sequence of frames. This specification 117 of the refresh scheme may be complemented with respective refresh offset values for respective types of subbands. These refresh offset values may be comprised in a table having an entry for each type of subband and containing a refresh offset value for the type of subband. This table may be predefined and stored in a memory, or another type of circuit, within the video encoder 100, as well as within a complementary video decoder.

For a given type of subband, the aforementioned parameters, the refresh rate, the frame index, and the refresh offset value, may determine whether a subband frame portion is to be forcibly encoded in the intra-mode, or not. A subband frame portion may have a group index defining the subband frame portion's position within a subband frame. The following rule may then be applied. If {([group index]+[frame index]+[refresh offset value]) modulo [refresh rate]} is equal to 0, then the subband frame portion must be forcibly encoded in the intra-mode, otherwise not.

In another embodiment, the specification 117 of the refresh scheme may be comprised in a marker following a frame header. Such a marker thus occurs only once every frame, like the frame header. The marker may comprise several fields. One field may comprise a table specifying respective refresh offset values for respective types of subbands. Another field may comprise a table specifying respective refresh rates for respective types of subbands. These two tables thus specify the following two parameters for each type of subband: a refresh offset value and a refresh rate.

For a given type of subband, the aforementioned parameters, the refresh offset value, the refresh rate, may determine whether a subband frame portion is to be forcibly encoded in the intra-mode, or not. The following rule may then be applied. If {([group index]−[refresh offset value]) modulo [1<<refresh rate]} is equal to 0, then the subband frame portion must be forcibly encoded in the intra-mode, otherwise not. As mentioned hereinbefore, the group index defines the subband frame portion's position within the subband frame. The notation [1<<refresh rate] means that binary number one (1) is shifted to the left by a number of positions corresponding to the refresh rate. Thus, [1<<refresh_rate] is equivalent to [2 to the power refresh_rate] if refresh rate is a positive integer.

A general advantage of the specification 117 of the refresh scheme being provided with the encoded sequence of frames 114 is that there is no need for providing an encoding mode flag with each encoded subband frame portion. Namely, the specification 117 of the refresh scheme indicates subband frame portions that are forcibly encoded in the intra-mode. Specifically, the specification 117 of the refresh scheme comprises a set of parameters that applies generally to many respective encoded subband frame portions, which may cover multiple encoded frames, indicating for each encoded subband frame portion whether the encoded subband frame portion has forcibly been encoded in the intra-mode, or not. Thus, there is no need for providing an encoding mode flag for the encoded subband frame portions that have been forcibly encoded in the intra-mode. This may constitute an economy in signaling data, allowing more room for other data, in particular encoded subband frame portions. In turn, this may contribute to a better ratio of video quality to data bandwidth.

The data packaging module 108 may further include the evaluation flag 115 in the data set mentioned hereinbefore, in association with the subband frame portion to which the evaluation flag 115 belongs. In combination with the specification 117 of the refresh scheme, an indication is thus provided on whether, or not, the subband frame portion concerned was forcibly encoded in the intra-mode, although the evaluation was made that the inter-mode should apply. As explained hereinbefore, this indication allows cost-efficient implementations of giving the preferential treatment mentioned hereinbefore. The embodiment presented here is an example of such a cost-efficient implementation. Moreover, the aforementioned indication may also allow implementing the aforementioned preferential treatment in existing coding techniques in an efficient manner, in particular in terms of efficient use of data.

Figure 3:
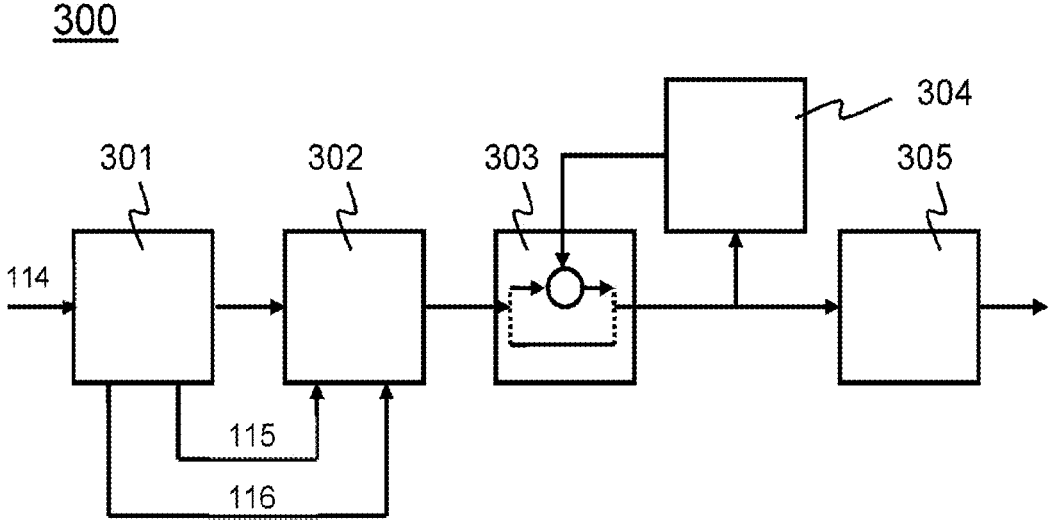
FIG. 3 is a schematic block diagram of a video decoder.

FIG. 3 schematically illustrates a video decoder 300, which is complementary with the video decoder 300 described hereinbefore with reference to FIGS. 1 and 2. FIG. 3 provides a schematic block diagram of the video decoder 300. The video decoder 300 illustrated in FIG. 3 is an innovatively improved version of a video decoder 300 presented in patent publication WO2020249790A1 mentioned hereinbefore. The latter video decoder 300 will be referred to hereinafter as prior art video decoder for the sake of convenience. The video decoder 300 illustrated in FIG. 3 of the present patent application comprises a similar set of functional entities. These functional entities include an unpacking module 301, an entropy decoding and dequantization assembly 302, a decoding reconstruction module 303, a decoding buffer memory 304, an inverse wavelet and color transform module 305.

Basically, the video decoder 300 may receive and decode the encoded sequence of frames 114 produced by the video encoder 100 illustrated in FIG. 1. The video encoder 100 basically operates in a manner similar to that of the prior art video decoder. The description of the prior art video decoder in patent publication WO2020249790A1 therefore equally applies to the video decoder 300 illustrated in FIG. 3, unless indicated otherwise.

The video decoder 300 basically operates as follows. The unpacking module 301 carries out operations inverse to those carried out by the packing module described hereinbefore. Accordingly, the unpacking module 301 retrieves various types of data, which includes encoded subband frame portions, the specification 117 of the refresh scheme, and respective evaluation flags 115 associated with respective encoded subband frame portions. The unpacking module 301 may further derive respective refresh flags 116 associated with respective encoded subband frame portions on the basis of the specification 117 of the refresh scheme.

Figure 4:
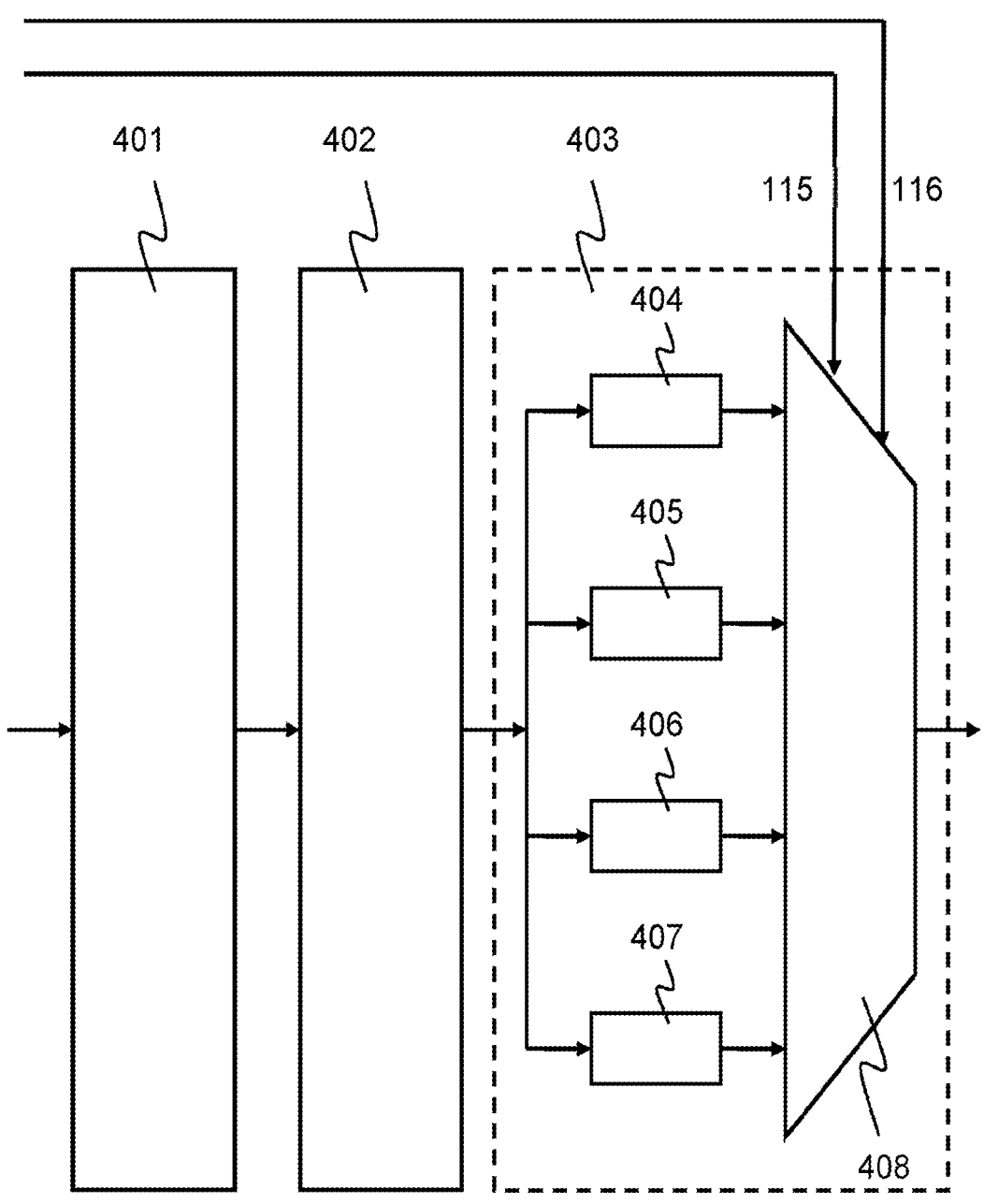
FIG. 4 is a schematic block diagram of an entropy decoding and dequantization assembly in the video decoder.

FIG. 4 schematically illustrates the entropy decoding and dequantization assembly 302, which is different from the entropy decoding and dequantization module in the prior art video decoder. FIG. 4 provides a schematic block diagram of the entropy decoding and dequantization assembly 302. The entropy decoding and dequantization assembly 302 comprises an entropy decoding module 401, a primary dequantization module 402, and a post dequantization module 403. The post dequantization module 403 comprises a set of bit shifters 404-407 and a multiplexer 408. The set of bit shifters 404-407 comprises a first bit shifter 404, a second bit shifter 405, a third bit shifter 406, and a fourth bit shifter 407.

The entropy decoding module 401 and the primary dequantization module 402 may operate in a manner similar to that of the entropy decoding and dequantization module in the prior art video decoder. The primary dequantization module 402 provides respective partially dequantized subband frame portions, if encoded in the intra-mode, and partially dequantized differential representations of subband frame portions, if encoded in the inter-mode. These will jointly be referred to as partially dequantized frame portions for the sake of convenience.

The post dequantization module 403 basically operates as follows. The set of bit shifters 404-407 receives samples comprised in a partially dequantized frame portion. The first bit shifter 404 does not shift the samples. The second bit shifter 405 shifts the samples two positions to the left. In effect, this provides substitutes for two least significant bits that have been truncated. The third and the fourth bit shifters 406, 407 shift the samples three positions to the left. In effect, this provides substitutes for three least significant bits that have been truncated.

The multiplexer 408 selects one of the bit shifters in dependence on an evaluation flag 115 and a refresh flag 116. These flags belong to the partially dequantized frame portion of which the samples are applied to the set of bit shifters 404-407. The multiplexer 408 selects the first bit shifter 404 in case the evaluation flag 115 indicates that the inter-mode should have been applied to the subband frame portion concerned and the refresh flag 116 indicates that the subband frame portion has been forcibly encoded in the intra-mode.

In that case, the post dequantization module 403 does not alter the samples of the partially dequantized frame portions.

The multiplexer 408 selects the second bit shifter 405 in case the evaluation flag 115 indicates that the inter-mode should have been applied to the subband frame portion concerned and the refresh flag 116 indicates there has been no forcible encoding in the intra-mode. In that case, the post dequantization module 403 provides zeroes as substitutes for the two least significant bits that have been truncated.

The multiplexer 408 selects the third bit shifter 406 in case the evaluation flag 115 indicates that the intra-mode should have been applied and the refresh flag 116 indicates that forcible encoding in the intra-mode has applied for the subband frame portion concerned. In that case, the post dequantization module 403 provides zeroes as substitutes for the three least significant bits that have been truncated.

The multiplexer 408 selects the fourth bit shifter 407 in case the evaluation flag 115 indicates that the intra-mode should have been applied and the refresh flag 116 indicates there has been no forcible encoding in the intra-mode. In that case, the post dequantization module 403 provides zeroes as substitutes for the three least significant bits that have been truncated.

The following table illustrates the operation of the post dequantization module 403:

| Evaluation flag 115 (1 for inter) | Refresh flag 116 (1 for refresh) | Post dequantization "Gain" (implemented as left shift) |
| --- | --- | --- |
| 1 | 1 | 1 (i.e. << 0) |
| 1 | 0 | 4 (i.e. << 2) |
| 0 | 1 | 8 (i.e. << 3) |
| 0 | 0 | 8 (i.e. << 3) |

In effect, the post dequantization module 403 thus inverses relative weights that the pre-quantization module 201 in the video encoder 100 has given with respect to quantization. In a certain sense, the pre-quantization module 201 in the video encoder 100 may be regarded as an equalizer boosting a zone in a frame that may cause visual artifacts if quantized in a conventional manner. Conversely, the post dequantization module 403 in the video decoder 300 may be regarded as an inverse equalizer, which neutralizes the aforementioned boosting in dequantization.

NOTES

The embodiments described hereinbefore with reference to the drawings are presented by way of illustration. The invention may be implemented in numerous different ways. In order to illustrate this, some alternatives are briefly indicated.

There are numerous different ways of implementing an encoding technique in accordance with the invention. In the embodiments presented hereinbefore, the encoding technique was applied to a video encoding scheme described in patent publication WO2020249790A1 in which inter-mode encoding is done in a transform domain. In this context, a zone in a frame corresponds with a subband frame portion having a particular position in each of a series of successive frames in the transform domain. The encoding technique may also be applied to a video encoding scheme in which inter-mode encoding is done in a purely spatial, pixel domain, In such a scheme, the linear transformation is done after inter-mode encoding, rather than before. In such a context, a zone in a frame corresponds with a portion of a frame having a particular position in each of a series of successive frames, such as, for example, an upper-left corner.

In general, there are numerous different ways of implementing video encoding and video decoding in accordance with the invention. Any of the modules in the presented embodiments may be implemented by means of an electrical circuit, which may be dedicated or programmable, or by means of a suitably programmed processor, or a combination thereof. A computer program may define one or more operations that have been described with reference to the presented embodiments. In this respect, the schematic block diagrams of FIGS. 1-4 may each also be regarded, at least partially, as representing a flow chart diagram of such a computer program, as well as representing a method that a processor may carry out when executing the computer program. For example, the pre-quantization module 201 in the block diagram of FIG. 2 may be regarded as representing a pre-quantization step. Similarly, other modules may be regarded as representing steps of a method.

Two innovative improvements have been presented. The first innovative improvement concerns giving preferential treatment in quantization when the intra-mode is enforced, whereas the inter-mode would have been used otherwise. The second innovative improvement concerns including a specification of a refresh scheme in a data set together with an encoded sequence of frames to which the refresh scheme has been applied. This second innovative improvement is subject of the appended claims. The second innovative improvement does not require use of the first innovative improvement, and vice versa. That is, the two innovative improvements are independent from each other, although these may jointly be applied in as in the embodiments described hereinbefore. Also, the first innovative improvement may be applied to video encoding schemes different from that described in patent publication WO2020249790A1. The remarks made hereinbefore equally apply.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. A method of encoding a sequence of frames so as to obtain an encoded sequence of frames, the method comprising:

making an evaluation on a frame-by-frame basis for respective zones in a frame having respective positions in the frame, the evaluation made for a zone concerning whether the zone should be encoded in one of the following two modes: an intra-mode or in an inter-mode, the evaluation retaining the one of the two modes that is expected to produce a smallest amount of data;

applying a refresh scheme throughout the encoding of the sequence of frames, the refresh scheme causing each of the respective zones to be forcibly encoded in the intra-mode for one out of several successive frames irrespective of the evaluation made;

providing a specification of the refresh scheme, the specification of the refresh scheme comprising a set of parameters that applies generally to multiple respective encoded zones and covers multiple encoded frames, the set of parameters indicating for each encoded zone whether the encoded zone has forcibly been encoded in the intra-mode, or not; and embedding the specification of the refresh scheme in a data set comprising the encoded sequence of frames.

2. The method of encoding a sequence of frames according to claim 1, wherein the specification of the refresh scheme is comprised in a frame header.

3. The method of encoding a sequence of frames according to claim 1, wherein the specification of the refresh scheme is comprised in several fields following a frame header.

4. A video encoder adapted to encode a sequence of frames so as to obtain an encoded sequence of frames, the video encoder comprising:

a encoding-mode selection assembly comprising:

an encoding-mode evaluation module adapted to make an evaluation on a frame-by-frame basis for respective zones in a frame having respective positions in the frame, the evaluation made for a zone concerning whether the zone should be encoded in one of the following two modes: an intra-mode or in an inter-mode, the evaluation retaining the one of the two modes that is expected to produce a smallest amount of data; and a refresh scheme application module adapted to apply a refresh scheme throughout the encoding of the sequence of frames, the refresh scheme causing each of the respective zones to be forcibly encoded in the intra-mode for one out of several successive frames irrespective of the evaluation made; and a data packaging module adapted to provide a data set comprising the encoded sequence of frames and including a specification of the refresh scheme, the specification of the refresh scheme comprising a set of parameters that applies generally to multiple respective encoded zones and covers multiple encoded frames, the set of parameters indicating for each encoded zone whether the encoded zone has forcibly been encoded in the intra-mode, or not.

5. A computer readable non-transitory memory storing a computer program loadable into a video encoder, the computer program comprising a set of instructions that enables the video encoder to carry out the method comprising:

making an evaluation on a frame-by-frame basis for respective zones in a frame having respective positions in the frame, the evaluation made for a zone concerning whether the zone should be encoded in one of the following two modes: an intra-mode or in an inter-mode, the evaluation retaining the one of the two modes that is expected to produce a smallest amount of data;

applying a refresh scheme throughout the encoding of the sequence of frames, the refresh scheme causing each of the respective zones to be forcibly encoded in the intra-mode for one out of several successive frames irrespective of the evaluation made;

providing a specification of the refresh scheme, the specification of the refresh scheme comprising a set of parameters that applies generally to multiple respective encoded zones and covers multiple encoded frames, the set of parameters indicating for each encoded zone whether the encoded zone has forcibly been encoded in the intra-mode, or not; and embedding the specification of the refresh scheme in a data set comprising the encoded sequence of frames.

6. A computer readable non-transitory memory storing a data set comprising:

an encoded sequence of frames obtained by a method comprising:

making an evaluation on a frame-by-frame basis for respective zones in a frame having respective positions in the frame, the evaluation made for a zone concerning whether the zone should be encoded in one of the following two modes: an intra-mode or in an inter-mode, the evaluation retaining the one of the two modes that is expected to produce a smallest amount of data;

applying a refresh scheme throughout the encoding of the sequence of frames, the refresh scheme causing each of the respective zones to be forcibly encoded in the intra-mode for one out of several successive frames irrespective of the evaluation made;

providing a specification of the refresh scheme, the specification of the refresh scheme comprising a set of parameters that applies generally to multiple respective encoded zones and covers multiple encoded frames, the set of parameters indicating for each encoded zone whether the encoded zone has forcibly been encoded in the intra-mode, or not; and embedding the specification of the refresh scheme in a data set comprising the encoded sequence of frames, the data set including the specification of the refresh scheme comprising the set of parameters that applies generally to multiple respective encoded zones and covers multiple encoded frames, the set of parameters indicating for each encoded zone whether the encoded zone has forcibly been encoded in the intra-mode, or not.

7. A video decoder adapted to decode a sequence of encoded frames obtained by a method comprising:

making an evaluation on a frame-by-frame basis for respective zones in a frame having respective positions in the frame, the evaluation made for a zone concerning whether the zone should be encoded in one of the following two modes: an intra-mode or in an inter-mode, the evaluation retaining the one of the two modes that is expected to produce a smallest amount of data;

applying a refresh scheme throughout the encoding of the sequence of frames, the refresh scheme causing each of the respective zones to be forcibly encoded in the intra-mode for one out of several successive frames irrespective of the evaluation made;

providing a specification of the refresh scheme, the specification of the refresh scheme comprising a set of parameters that applies generally to multiple respective encoded zones and covers multiple encoded frames, the set of parameters indicating for each encoded zone whether the encoded zone has forcibly been encoded in the intra-mode, or not; and embedding the specification of the refresh scheme in a
data set comprising the encoded sequence of frames,
the decoder being adapted to use the specification of the
refresh scheme, which comprises the set of parameters
that applies generally to multiple respective encoded
zones and covers multiple encoded frames, for decod-
ing encoded zones that were forcibly encoded in the
intra-mode.

\* \* \* \* \*